(12) United States Patent　　(10) Patent No.: US 9,147,105 B2
Sagawa et al.　　(45) Date of Patent: Sep. 29, 2015

(54) IMAGE RECOGNIZING APPARATUS, IMAGE RECOGNIZING METHOD, AND PROGRAM

(75) Inventors: Naotsugu Sagawa, Tokyo (JP); Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 13/604,362

(22) Filed: Sep. 5, 2012

(65) Prior Publication Data

US 2013/0064425 A1　Mar. 14, 2013

(30) Foreign Application Priority Data

Sep. 13, 2011　(JP) ................. 2011-199880

(51) Int. Cl.
*G06K 9/00*　　(2006.01)
*G06K 9/32*　　(2006.01)

(52) U.S. Cl.
CPC ........ *G06K 9/00221* (2013.01); *G06K 9/00362* (2013.01); *G06K 9/3233* (2013.01)

(58) Field of Classification Search
CPC ............ G06K 9/00221; G06K 9/3233; G06K 9/00362; G06K 9/34
USPC ....................................... 382/103
See application file for complete search history.

(56) References Cited

U.S. PATENT DOCUMENTS

| 7,020,337 | B2 | 3/2006 | Viola et al. | |
|---|---|---|---|---|
| 7,699,423 | B2 | 4/2010 | Suwa et al. | |
| 2006/0140455 | A1* | 6/2006 | Costache et al. | 382/118 |
| 2007/0127786 | A1* | 6/2007 | Hiraizumi et al. | 382/118 |
| 2010/0329550 | A1* | 12/2010 | Cheatle | 382/165 |
| 2011/0090359 | A1 | 4/2011 | Sagawa | |
| 2012/0063639 | A1 | 3/2012 | Yano | |
| 2012/0092495 | A1 | 4/2012 | Yano | |
| 2012/0269405 | A1 | 10/2012 | Kaneda et al. | |
| 2012/0288148 | A1 | 11/2012 | Suzuki et al. | |
| 2012/0288152 | A1 | 11/2012 | Yano | |

FOREIGN PATENT DOCUMENTS

| JP | 2004252940 A | 9/2004 |
|---|---|---|
| JP | 2010-160640 A | 7/2010 |
| JP | 2010176504 A | 8/2010 |

OTHER PUBLICATIONS

P. Viola, et al. "Robust Real-time Object Detection", Second International Workshop on Statistical and Computational Theories of Vision, Jul. 13, 2001, pp. 1-25.

(Continued)

*Primary Examiner* — Shefali Goradia
(74) *Attorney, Agent, or Firm* — Fitzpatrick, Cella, Harper & Scinto

(57) ABSTRACT

An image recognizing apparatus is equipped with: a detecting unit configured to detect, from an input image, a candidate area for a target of recognition, based on a likelihood of a partial area in the input image; an extracting unit configured to extract, from a plurality of candidate areas detected by the detecting unit, a set of the candidate areas which are in an overlapping relation; a classifying unit configured to classify an overlapping state of the set of the candidate areas; and a discriminating unit configured to discriminate whether or not the respective candidate areas are the target of recognition, based on the overlapping state of the set of the candidate areas and the respective likelihoods of the candidate areas.

6 Claims, 10 Drawing Sheets

(56) References Cited

OTHER PUBLICATIONS

N. Dalal, et al., "Histograms of Oriented Gradients for Human Detections", (CVPR 2005), pp. 1-8.

U.S. Appl. No. 13/683,409, filed Nov. 21, 2012, Applicants: Yuji Kaneda, et al.

U.S. Appl. No. 13/686,429, filed Nov. 27, 2012, Applicants: Atsuo Nomoto, et al.

Japanese Office Action dated Jul. 7, 2015 corresponding to Japanese Application No. 2011-199880.

* cited by examiner $Rw = Wb/Ws$ $Rh = Hb/Hs$ $L = M/Wb$

FIG. 7

| | θ | L | Rw | Rh |
|---|---|---|---|---|
| OVERLAPPING STATE 701 | 70°~90° | Wb*1/5<L<Wb*2/5 | Wb*1/5<Rw<Wb*1/4 | Hb*2/5<Rh<Hb*3/5 |
| OVERLAPPING STATE 702 | 60°~75° | Wb*3/5<L<Wb*4/5 | Wb*1/5<Rw<Wb*1/4 | Hb*2/5<Rh<Hb*3/5 |
| OVERLAPPING STATE 703 | 0°~15° | Wb*1/10<L<Wb*2/10 | Wb*2/5<Rw<Wb*3/5 | Hb*2/5<Rh<Hb*3/5 |

FIG. 8

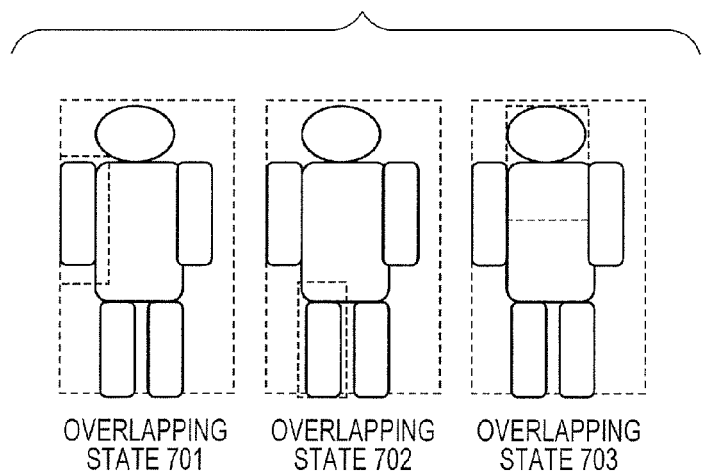

OVERLAPPING STATE 701   OVERLAPPING STATE 702   OVERLAPPING STATE 703

FIG. 9

| CLASSIFICATION ID | CONDITION FOR LIKELIHOOD RATIO | DISCRIMINATION RESULT OF LARGE AREA | DISCRIMINATION RESULT OF SMALL AREA |
|---|---|---|---|
| 901 | R>Ra(Ra>2) | HUMAN BODY | ERRONEOUS DETECTION |
| 902 | R<Rb(Rb<0.3) | ERRONEOUS DETECTION | HUMAN BODY |
| 903 | Rb≦R≦Ra | HUMAN BODY | HUMAN BODY |

1201  1202  1203

THE NUMBER
OF AREA SETS

θ3 θ2 θ1 90°   180°   240°   360°   θ

THE NUMBER
OF AREA SETS

L1   1.0   2.0°   2.23   L

FIG. 15
| RANGE OF θ1 | 70°<θ1<90° |
|---|---|
| RANGE OF L1 | Wb*1/5<L1<Wb*2/5 |
| RANGE OF Rw1 | Wb*1/5<Rw1<Wb*1/4 |
| RANGE OF Rh1 | Hb*2/5<Rh1<Hb*3/5 |
FIG. 16
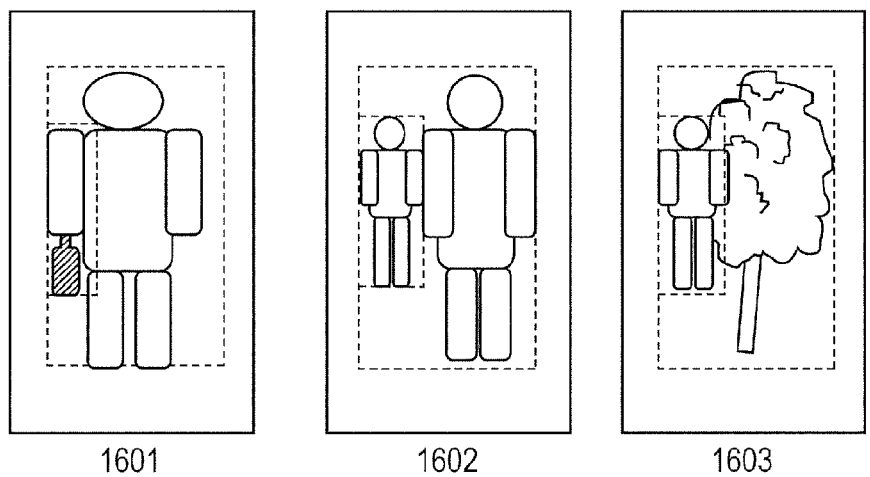
1601    1602    1603
FIG. 17
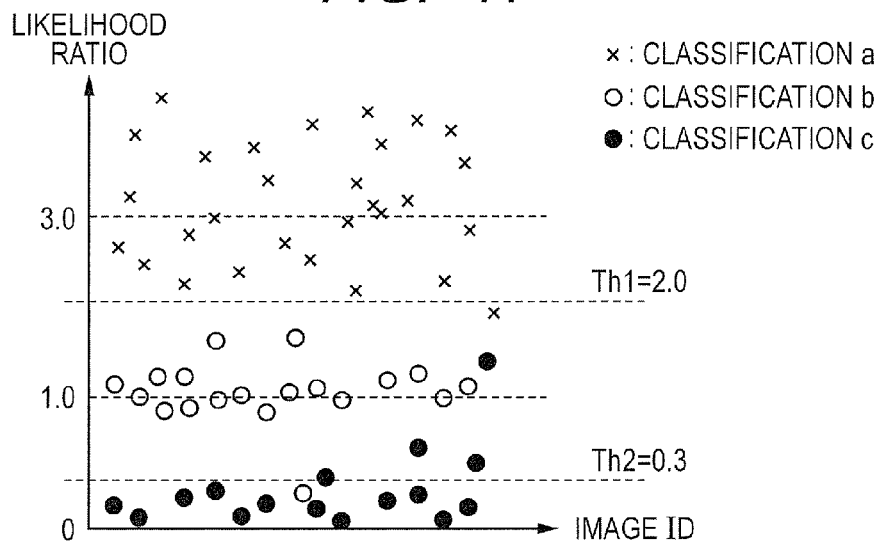

|  | DISCRIMINATION PROCESS RESULT ($P_{AB}$) | DISCRIMINATION PROCESS RESULT ($P_{BC}$) | DISCRIMINATION PROCESS RESULT ($P_{CA}$) |
|---|---|---|---|
| AREA 1901 | ERRONEOUS DETECTION | — | ERRONEOUS DETECTION |
| AREA 1902 | HUMAN BODY | HUMAN BODY | — |
| AREA 1903 | — | HUMAN BODY | HUMAN BODY |

IMAGE RECOGNIZING APPARATUS, IMAGE RECOGNIZING METHOD, AND PROGRAM

BACKGROUND OF THE INVENTION

1. Field of the Invention

The present invention relates to an image recognizing apparatus, an image recognizing method, and a program for the image recognizing method. In particular, the present invention relates to a technique which is suitably used to detect a specific subject such as a person, an automobile or the like or a part thereof from an image.

2. Description of the Related Art

A technique of detecting a specific subject image from a general image is widely applied to various fields such as image search, object detection, object recognition, object tracing and the like. As an example of the technique like this, a method of particularly detecting a face area from a general image has been proposed (see P. Viola and M. Jones, "Robust Real-time Object Detection" SECOND INTERNATIONAL WORKSHOP ON STATISTICAL AND COMPUTATIONAL THEORIES OF VISION, Jul. 13, 2001). In this method, a rectangular small area (hereinafter, called a detection window) is first extracted from an input image, and it is discriminated whether or not a face is included in the detection window. Here, such discrimination is performed by passing the detection window through a discriminator which is constituted by cascade-connecting strong discriminators. In a case where the detection window is discriminated as a subject by all the strong discriminators, a result indicating that the face is included in the detection window is output. Contrarily, in other cases, a result indicating that the fact is not included in the detection window is output.

On another front, as an effective method for detecting a human whole body area of which the shape fluctuation is larger than that of a face, there has been proposed a method of using as a feature quantity an HOG (Histograms of Oriented Gradients) in which a histogram of gradients in a rectangular area is provided for each direction (see N. Dalal and B. Triggs "Histograms of Oriented Gradients for Human Detections" (CVPR2005)). Incidentally, the human whole body area will be called a human body area in the following description.

In such techniques as described above, there is a problem that a physical body, a background or the like which is similar to the shape of a subject but is not actually the subject is erroneously detected. In particular, in case of detecting a human body, an area around the human body tends to be erroneously detected. For example, there is a case where a shoulder or a leg which is a part of the human body is erroneously detected as the human body area. This is because it is conceivable that the shape of the shoulder or the leg is similar to the shape of the human body (i.e., the shape of the laterally-facing human body). Moreover, when a person overlaps a background such as a tree(s), a mountain(s) or the like having a rounded shape upwardly, an area including not only the person but also the background is erroneously detected as the human body area. This is because it is conceivable that the shape obtained by combining the tree(s) or the mountain(s) with the person is similar to the shape of a human body.

A human body area often exists in the vicinity of such erroneous detection, and the relevant human body area is correctly detected. For this reason, a result obtained by correctly detecting the human body area and a result obtained by erroneously detecting the area other than the human body area often overlap each other. Under such a situation, Japanese Patent Application Laid-Open No. 2010-176504 has proposed a method of, when there are overlapping detection results, comparing the likelihoods of these results and selecting the detection result having the higher likelihood.

However, the above method is not suitable for a case where both the overlapping detection results are directed to the human body areas. For example, this method is not suitable for a case where a child stands in front of an adult, a case where, although two persons seem to stand side by side, one person actually stands at a distant place behind the other person, and the like. In any case, when the above method is applied to such circumstances, there is a fear that the human body area correctly detected is deleted from detection candidates as an erroneous detection result.

SUMMARY OF THE INVENTION

According to one aspect of the present invention, there is provided an image recognizing apparatus which is characterized by comprising: a detecting unit configured to detect, from an input image, a candidate area for a target of recognition, based on a likelihood of a partial area in the input image; an extracting unit configured to extract, from a plurality of candidate areas detected by the detecting unit, a set of the candidate areas which are in an overlapping relation; a classifying unit configured to classify an overlapping state of the set of the candidate areas; and a discriminating unit configured to discriminate whether or not the respective candidate areas are the target of recognition, based on the overlapping state of the set of the candidate areas and the respective likelihoods of the candidate areas.

Further features of the present invention will become apparent from the following description of exemplary embodiments with reference to the attached drawings.

BRIEF DESCRIPTION OF THE DRAWINGS

FIG. 7 is a diagram indicating a range of positional relations of two areas corresponding to the overlapping state.

FIG. 8 is a diagram illustrating examples of images in the overlapping state of FIG. 7.

FIG. 9 is a diagram indicating a correspondence table of a classification, a likelihood ratio, a discrimination result of a large area, and a discrimination result of a small area.

FIG. 15 is a diagram indicating ranges of respective parameters in a high-frequency area set.

FIG. 16 is a diagram illustrating examples of images of an area set satisfying a high-frequency positional relation.

FIG. 17 is a diagram for describing correspondence between an image ID and a likelihood ratio.

DESCRIPTION OF THE EMBODIMENTS

Hereinafter, preferred embodiments of the present invention will now be described in detail with reference to the attached drawings. In the following embodiments, methods, which are used in case of detecting a human body area from an image, of discriminating whether or not each of overlapping candidate areas is directed to a human body area, based on their overlapping state and likelihoods of the respective candidate areas will be described.

First Embodiment

Figure 1:
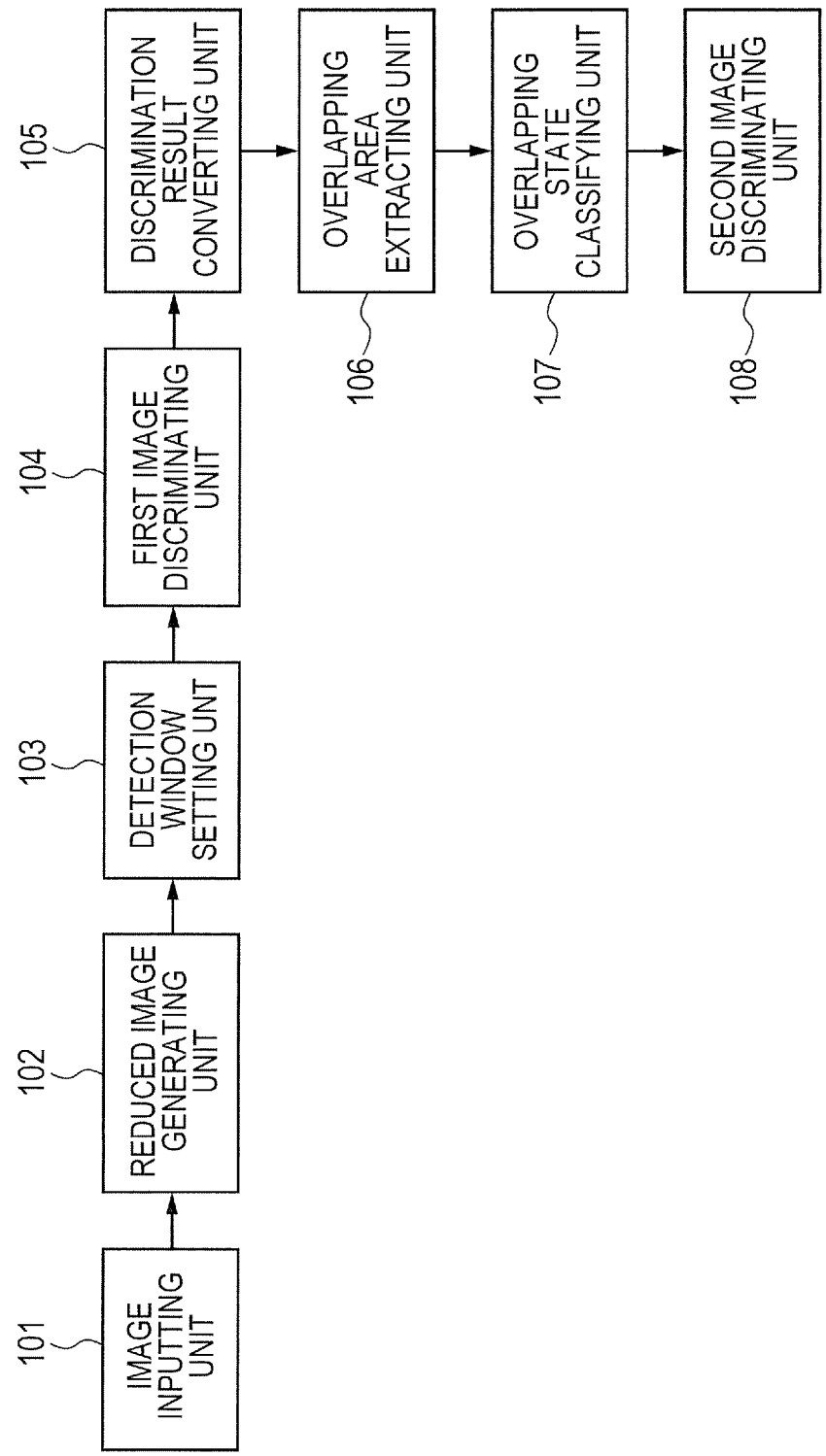
FIG. 1 is a block diagram illustrating an example of a constitution of an image identifying apparatus.

FIG. 1 is a block diagram illustrating an image identifying apparatus according to the first embodiment.

An image inputting unit 101 inputs an image which is a detection target, a reduced image generating unit 102 generates reduced images with several steps from the input image, a detection window setting unit 103 sets a detection window for the reduced image, a first image discriminating unit 104 discriminates whether or not a human body area exists in the detection window, a discrimination result converting unit 105 converts a discrimination result into the coordinate system of the original image, an overlapping area extracting unit 106 extracts an overlapping area from the discrimination result, an overlapping state classifying unit 107 classifies the overlapping state of the overlapping areas, and a second image discriminating unit 108 discriminates whether or not each of the overlapping areas is the human body area.

Figure 2:
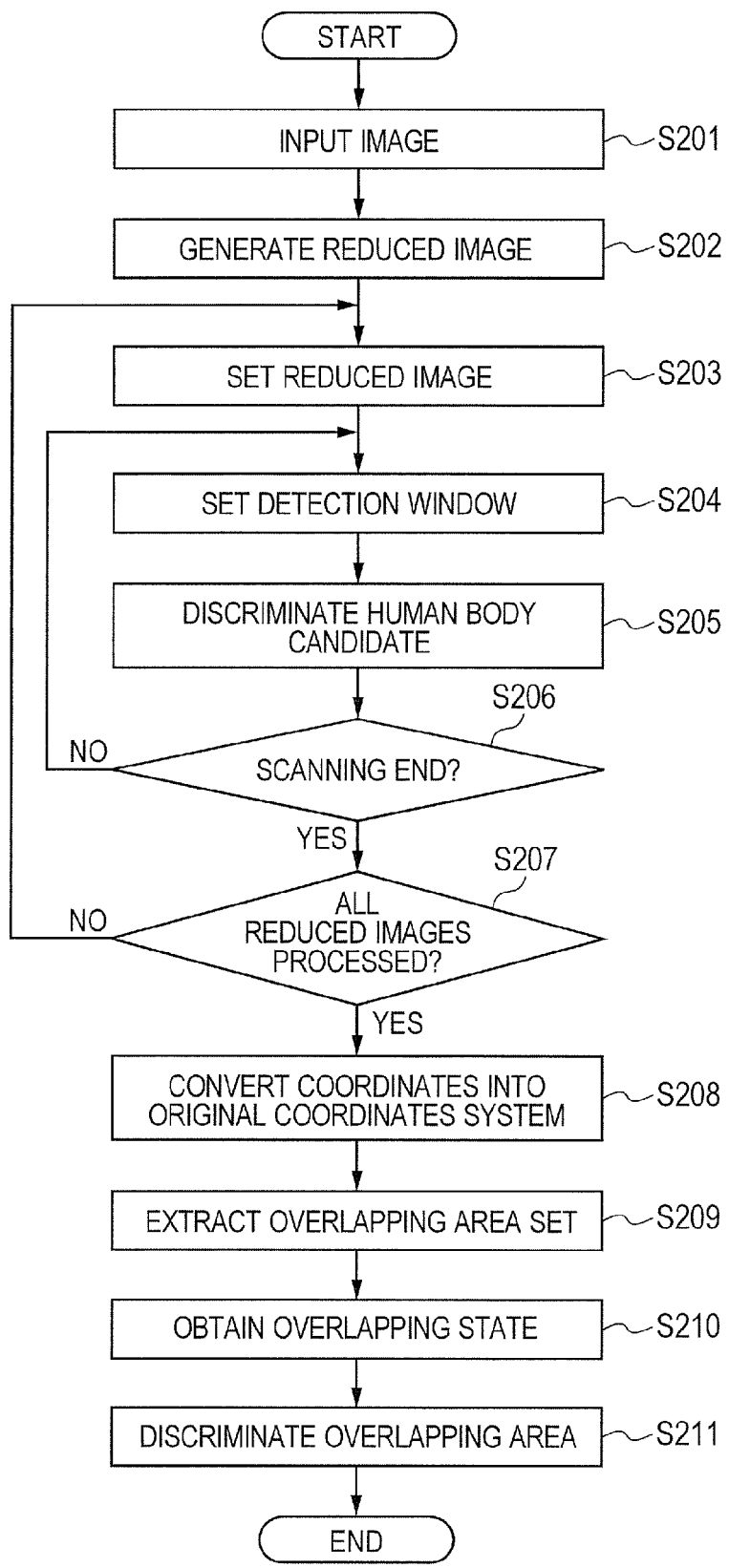
FIG. 2 is a flow chart for describing an example of a processing procedure according to a first embodiment.

Then, a process to be performed according to the present embodiment will be described with reference to a flow chart of FIG. 2.

First, in a step S201, the image inputting unit 101 inputs the image. In a step S202, the reduced image generating unit 102 generates the image data by sequentially reducing the input image at predetermined magnifications. This is because, to detect various sizes of person images, it is necessary to sequentially detect the person area of the same size from the image data reduced in plural sizes.

Figure 3:
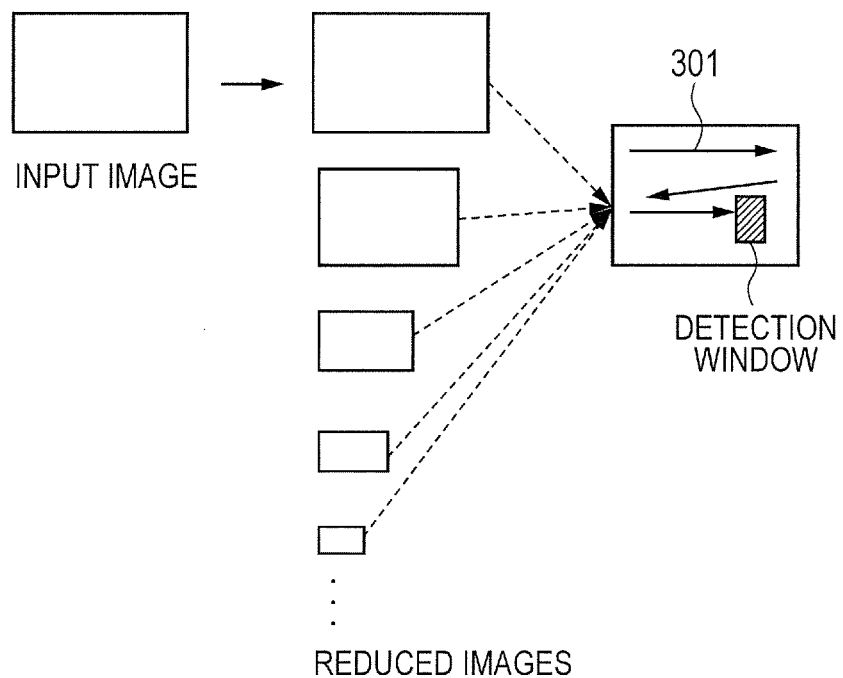
FIG. 3 is a diagram for describing a state that an image is scanned by a detection window.

Next, in a step S203, one of the reduced images generated in the step S202 is set. Then, in a step S204, the detection window setting unit 103 sets a partial area having a predetermined size to the reduced image. Hereinafter, the partial area will be called a detection window, and a subsequent discrimination process will be performed in regard to the detection window. Since all the reduced images are the target to be detected, the detection window is scanned every several pixels in the lateral direction and the longitudinal direction as indicated by arrows 301 in FIG. 3.

Next, in a step S205, the first image discriminating unit 104 performs an image discriminating process for discriminating by using a recognition model of a human body whether or not the human body area is included in the detection window. The method of performing the image discriminating process is not limited to the above method. Namely, any method may be used if it calculates a likelihood by applying the recognition model of outputting the likelihood of the human body for the image pattern of the detection window and discriminates based on the calculated likelihood whether or not the human body candidate area is included in the detection window.

For example, it is possible to use a method as disclosed in Japanese Patent Application Laid-Open No. 2004-252940 of obtaining likelihoods for recognition targets from a plurality of areas in a detection window and discriminating, by comparing the obtained likelihoods with previously set thresholds, whether or not the recognition targets are included in the detection window. Incidentally, in the step S205, when it is discriminated that the human body image is included in the detection window, the first image discriminating unit 104 outputs the position coordinates of the detection window in the reduced image and the likelihood calculated in the discriminating process.

Next, in a step S206, the first image discriminating unit 104 discriminates whether or not all the reduced images have been scanned by the detection window. When the end of the scanning is discriminated, the flow is moved to a step S207. On the other hand, when the end of the scanning is not discriminated, the flow is returned to the step S204 to repeatedly perform the processes up to the step S206. In the step S207, the first image discriminating unit 104 discriminates whether or not the processes from the step S203 to the step S206 have been performed for all the reduced images. When the steps have been performed for all the reduced images, the flow is moved to a step S208. On the other hand, when the steps have not been performed, the flow is returned to the step S203 to repeatedly perform the processes up to the step S207. Then, the human body candidate area in the reduced image is detected in the processes to be performed up to the step S207.

Figure 4:
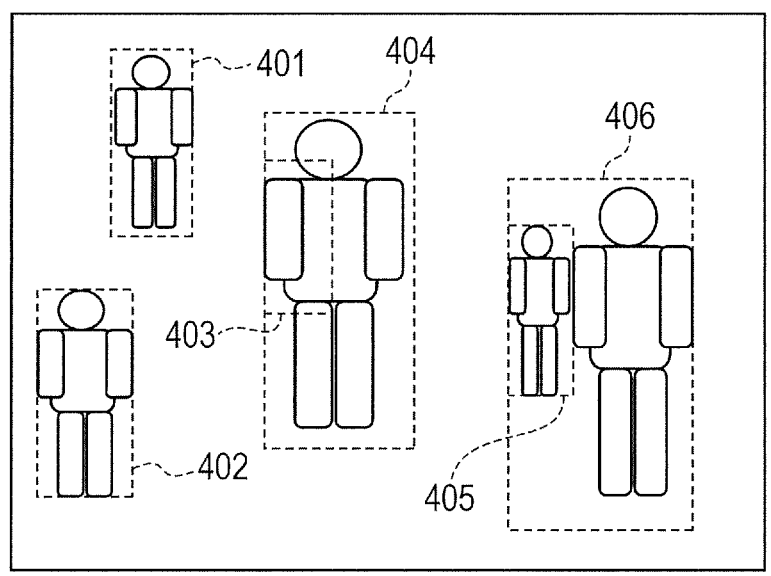
FIG. 4 is a diagram illustrating a detection result of human body candidate areas.

Next, in the step S208, the discrimination result converting unit 105 converts the position coordinates of the human body candidate area in the reduced image output in the step S205 into the coordinate system of the original image, and outputs the converted result. Further, the likelihood corresponding to each human body candidate area is stored together with its coordinates for use of in the subsequent processes. An example of the human body candidate areas obtained in the above processes is shown in FIG. 4. In the example of FIG. 4, six human body candidate areas 401 to 406 have been detected.

Figure 5:
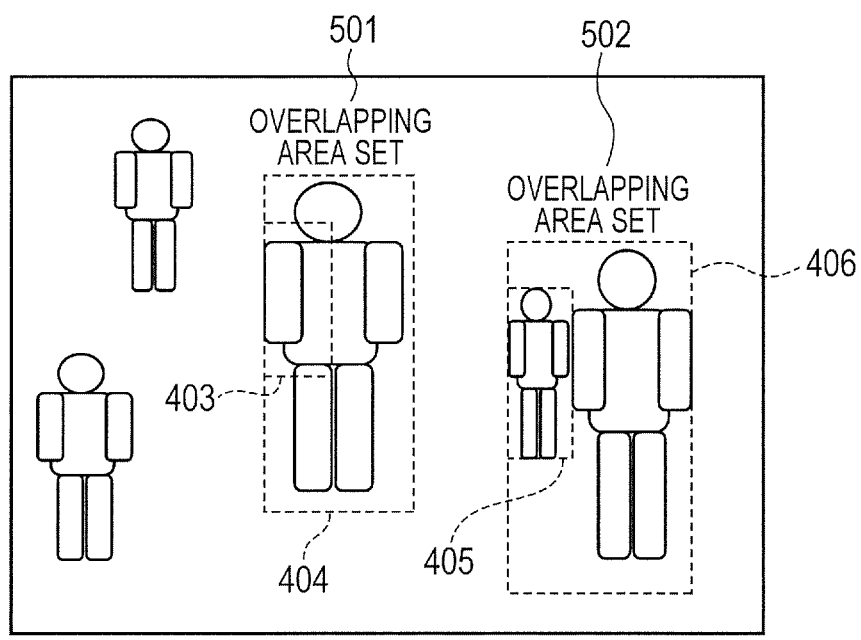
FIG. 5 is a diagram for describing extraction of overlapping areas.

Next, in a step S209, the overlapping area extracting unit 106 extracts a set of the areas in which the areas of the human body candidate areas overlap each other (hereinafter, called an overlapping area set), based on the coordinates of the human body candidate areas calculated in the step S208. An extraction result is shown in FIG. 5. In the example of FIG. 5, an overlapping area set 501 including the human body candidate areas 403 and 404 and an overlapping area set 502 including the human body candidate areas 405 and 406 have been extracted. Incidentally, as the overlapping area set to be extracted, it is possible to select a case where a part of the human body candidate area overlaps another area, and select a case where the overlapping areas have a predetermined area (size) or more. In the present embodiment, as illustrated in FIG. 5, the area set of the positional relation that one of the areas includes the other of the areas is extracted as the overlapping area set.

Figure 6:
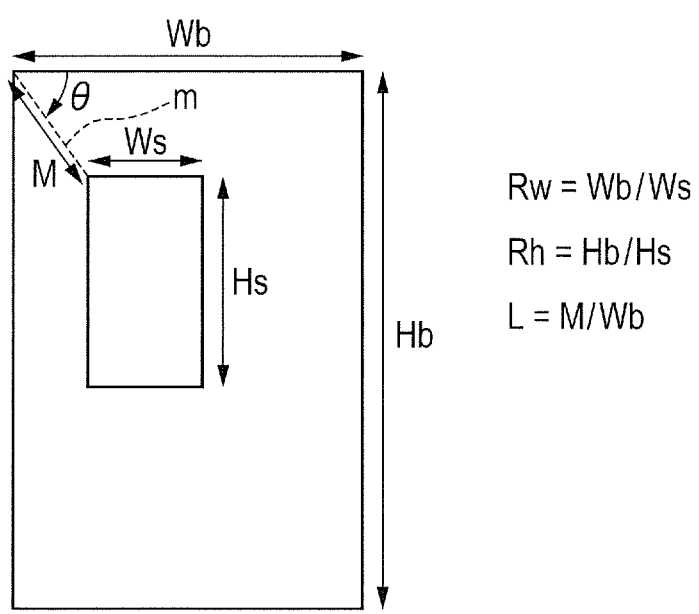
FIG. 6 is a diagram for describing an overlapping state of two rectangles.

In a step S210, the overlapping state classifying unit 107 obtains the overlapping state indicating how the overlapping areas extracted in the step S209 mutually overlap. Here, the overlapping state is equivalent to the positional relation of the mutual overlapping areas. In the step S210, it is classified to which of previously defined positional relations the obtained positional relation corresponds. The positional relation of the overlapping area set is defined by the following four parameters as illustrated in FIG. 6.

an angle θ between a straight line m connecting the upper left coordinates of the two areas and the image horizontal direction;
a ratio L of a length M of the straight line m to a width Wb of the large area;
a ratio Rw of the width Wb of the large area to a width Ws of the small area; and
a ratio Rh of a height Hb of the large area to a height Hs of the small area.

In the present embodiment, a correspondence table illustrated in FIG. 7 has been previously prepared. Then, the overlapping state classifying unit 107 determines to which of overlapping states 701 to 703 the attention overlapping area set is classified, based on the correspondence table and the above four parameters. FIG. 8 indicates the concrete positional relations of the overlapping area sets in the overlapping states 701 to 703 shown in FIG. 7. That is, the overlapping state 701 corresponds to the positional relation which frequently appears when the shoulder area of the human body is erroneously detected, the overlapping state 702 corresponds to the positional relation which frequently appears when the foot area of the human body is erroneously detected, and the overlapping state 703 corresponds to the positional relation which frequently appears when the head area of the human body is erroneously detected.

Incidentally, with respect to overlapping states other than the three states shown in FIG. 7, the overlapping two areas are both discriminated as the human bodies because statistical data analysis has not been sufficiently performed due to a problem of a less data quantity or the like. The present embodiment will be described on the assumption that, as a result of the classification of the overlapping states for the overlapping area sets shown in FIG. 5, the overlapping states are respectively classified to the overlapping state 701.

Next, in a step S211, the second image discriminating unit 108 discriminates, based on the likelihoods of the large area and the small area of the overlapping area set, whether or not each area is the human body area. In the present embodiment, the discrimination results for the large area and the small area are obtained according to the discrimination condition shown in FIG. 9. In the discrimination condition, a likelihood ratio R between the large area and the small area is calculated, and the discrimination result for each area is determined by comparing the likelihood ratio with thresholds Ra and Rb.

Incidentally, the discrimination condition is determined by statistically analyzing the likelihood ratios of the overlapping area sets with use of previously collected images in large quantity. The detail of the method of determining the discrimination condition will be described later. By the above discriminating process, it is assumed that two overlapping area sets 501 and 502 of FIG. 5 are respectively classified to classifications 901 and 903 in the classifications 901 to 903 of FIG. 9.

Figure 10:
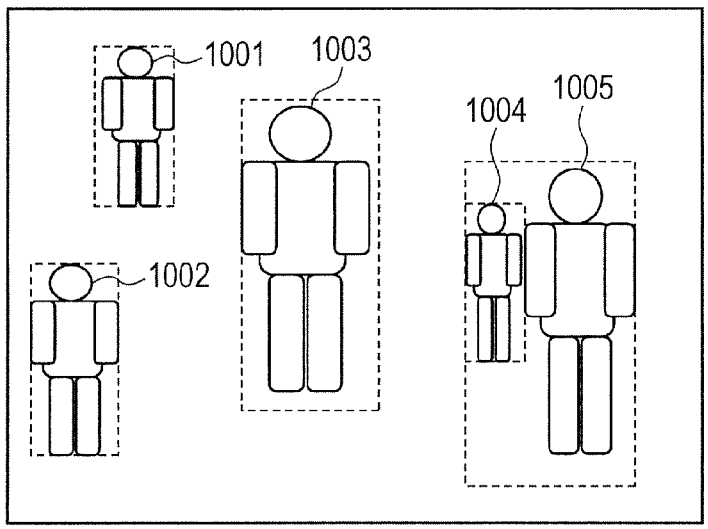
FIG. 10 is a diagram illustrating a detection result.

As a result of the discriminating process in the step S211, in the overlapping areas of FIG. 5, the human body candidate area 403 is discriminated as the erroneous detection, the human body candidate area 404 is discriminated as the human body area, and both the human body candidate areas 405 and 406 are discriminated as the human body areas. An example of the finally detected result is illustrated in FIG. 10. After the human candidate areas were detected (FIG. 4), the erroneous detection occurred in the vicinity of the shoulder of a person 1003. However, the erroneous detection can be deleted by the processes to be performed in the steps S209 to S211. Further, at this time, with respect to the human body candidate areas 405 and 406 respectively similar to the human body candidate areas 403 and 404, it is possible to correctly detect persons 1004 and 1005 respectively. Also, it is possible to correctly detect persons 1001 and 1002 respectively.

Figure 11:
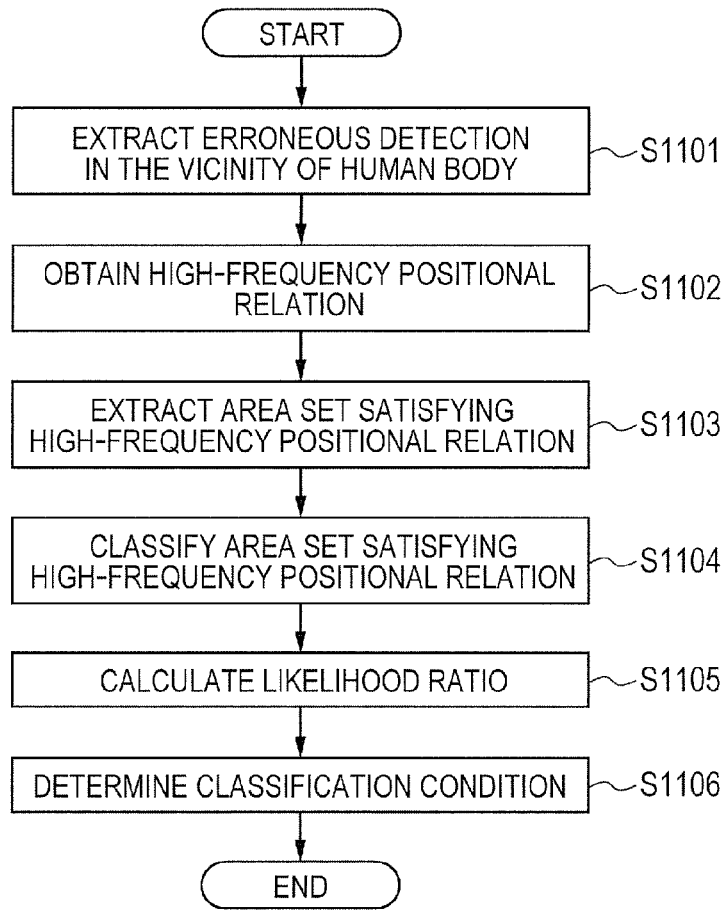
FIG. 11 is a flow chart for describing an example of a determination processing procedure of a discrimination condition.

Hereinafter, the method of determining the discrimination condition used in the step S211 will be described. In this method, from among the erroneous detections which occur in the vicinity of the human body, the erroneous detections which occur with a high frequency are extracted, and the discrimination condition is determined based on the statistical data concerning the extracted result. Here, it is assumed that the discrimination condition in the present embodiment is the condition (threshold) to be set for the likelihood calculated from the overlapping area. Hereinafter, a determination processing procedure of the discrimination condition will be described with reference to a flow chart illustrated in FIG. 11. Although this procedure may be performed by an apparatus independent of the above image recognizing apparatus, the following description is premised that this procedure is performed by the apparatus identical with the image recognizing apparatus.

Figure 12:
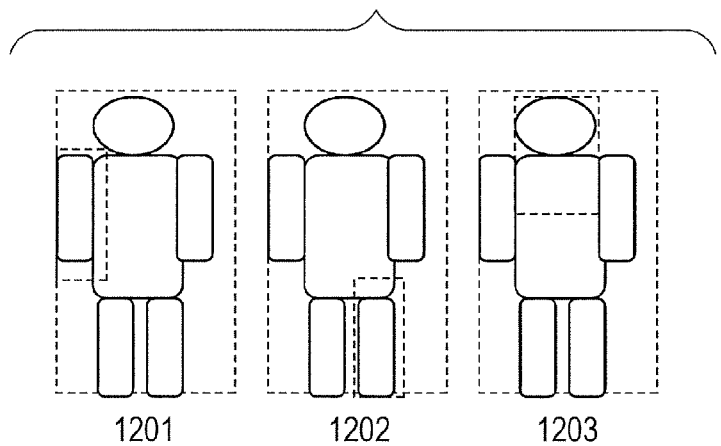
FIG. 12 is a diagram illustrating examples of erroneous detections nearby a human body.

In a step S1101, the overlapping area extracting unit 106 extracts the erroneous detection occurring in the vicinity of the human body. The human body detection is performed, by using the first image discriminating unit 104, to the image set in which the person area has already been known. Among the detected results, only the image in which the person area has been correctly detected and the erroneous detection overlapping the human area occurs is extracted. An example of the extracted images is illustrated in FIG. 12. More specifically, the area near the shoulder has been erroneously detected in an image 1201, the area near the foot has been erroneously detected in an image 1202, and the area near the head has been erroneously detected in an image 1203. Besides, in various cases, erroneous detections occur in the vicinity of the human body. In these erroneous detections, only the erroneous detection occurring with the high frequency is extracted in a next step S1102.

Figure 13:
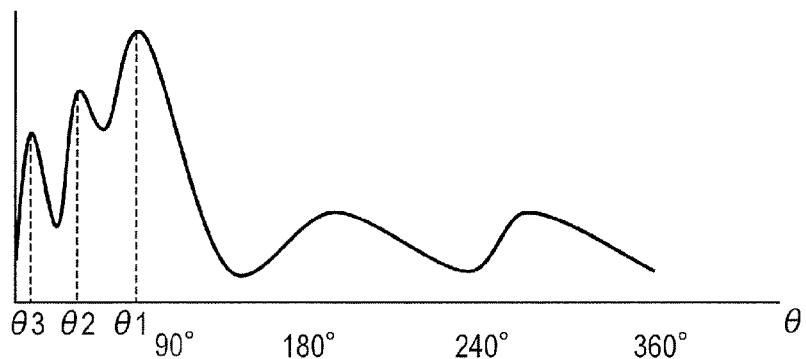
FIG. 13 is a diagram for describing the number of area sets for an angle θ.

Next, in the step S1102, the overlapping area extracting unit 106 extracts only the erroneous detection occurring with the high frequency, from among the erroneous detections near the human body extracted in the step S1101, and obtains the positional relation of the area of the whole human body and the erroneous detection area (hereinafter, called a high-frequency positional relation) in this case. First, the overlapping area extracting unit 106 calculates the four parameters (the angle θ between the two areas, the ratio L of the straight line m to the width of the large area, the ratio Rw of the width, and the ratio Rh of the height) defined in the step S210, for the area set extracted in the step S1101. Next, the overlapping area extracting unit 106 creates the histogram of the area set while paying attention to only the angle θ. An example of the histogram created here is illustrated in FIG. 13. In this histogram, the frequencies at angles θ1, θ2 and θ3 are high. The present embodiment pays attention to the angle θ1 (hereinafter, called a high-frequency angle) of which the frequency is highest.

Figure 14:
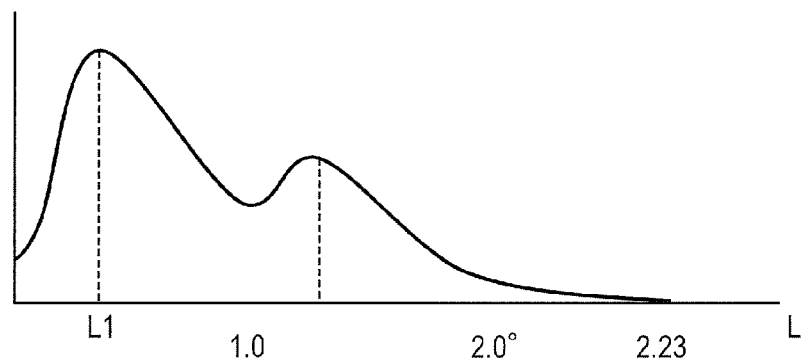
FIG. 14 is a diagram for describing the number of area sets for a ratio L.

Next, the overlapping area extracting unit 106 creates the histogram of the area set while paying attention to the ratio L, for the area set corresponding to the range of the angle determined as the high-frequency angle. An example of the histogram created here is illustrated in FIG. 14. A ratio L1 of which the frequency is high in this histogram is determined as a high-frequency ratio. Next, the overlapping area extracting unit 106 determines a high-frequency ratio Rw1 of the ratio Rw for the area set near the high-frequency ratio L1 in the same manner, and further determines a high-frequency ratio Rh1 of the ratio Rh for the area set near the ratio Rw1 of the width in the same manner. The high-frequency positional relations θ1, L1, Rw1 and Rh1 obtained as above are indicated in FIG. 15.

Next, in a step S1103, the overlapping area extracting unit 106 extracts, from among the area sets extracted in the step S1101, the set of which the four parameters satisfy the high-frequency positional relation obtained in the step S1102. Then, in a step S1104, the overlapping state classifying unit 107 classifies the detection condition for the area sets extracted in the step S1103. More specifically, it is classified whether the human bodies are detected respectively in the large area and the small area, or the erroneous detection occurs. The items to be classified are determined based on the detection result extracted in the step S1103.

For example, when the two overlapping detection results satisfy the high-frequency positional relation in the present embodiment, it is possible to confirm three images 1601 to 1603 illustrated in FIG. 16 as representative examples. More specifically, the image 1601 indicates the example that the human body is detected in the large area but the erroneous detection occurs in the small area, the image 1602 indicates the example that the human bodies are correctly detected in both the large area and the small area, and the image 1603 indicates the example that the tree is erroneously detected in the large area and the human body is detected in the small area. In summary, such three classifications are as follows:

a classification a. the human body is detected in the large area, and the erroneous detection occurs in the small area;

a classification b. the erroneous detection occurs in the large area, and the human body is detected in the small area; and a classification c. the human body is detected in the large area, and the human body is detected in the small area.

Incidentally, in this image classifying method, if the coordinates of a correct answer area of a person has been previously input for an evaluative image, it is possible to automatically perform the classification.

Next, in a step S1105, the second image discriminating unit 108 calculates the likelihood ratio of the large area to the small area on the basis of the likelihood of the large area and the likelihood of the small area for the area set extracted in the step S1103. Then, in a step S1106, the second image discriminating unit 108 determines the classification condition. Here, the classification condition is determined by creating a graph shown in FIG. 17 by plotting the likelihood ratio calculated in the step S1105 to the graph and then obtaining the border lines for separating the classifications a, b and c respectively. Hereinafter, a degree of separation of the classification a and the classification b is defined as Cab, a degree of separation of the classification b and the classification c is defined as Cbc, and a degree of separation of the classification a and the classification c is defined as Cac. Here, it is assumed that there are two sets, and it is further assumed that the number of the elements which cannot be separated by the border lines is h and the total number of the elements in the two sets is k. Then, the degree of separation C can be expressed by the following expression (1).

$$C = (k-h)/k \quad (1)$$

Here, if h=0, namely, if the two sets can be all separated, the degree of separation is given as C=1.0. Thus, as the degree of separation lowers, the value of C lowers. In the present embodiment, values Th1 and Th2 by which the degree of separation defined by the expression (1) respectively satisfy the following expressions (2) and (3) are searched, and the searched values are set as the thresholds in the classification condition.

$$Th1 = \max_{k}\left(if\left\{\frac{N_{ab} - \left(\sum_{L(a,i)<k}^{i} y(a,i) + \sum_{L(b,i)<k}^{i} y(b,i)\right)}{N_{ab}} > c\right\}\right) \quad (2)$$

$$Th2 = \max_{k}\left(if\left\{\frac{N_{bc} - \left(\sum_{L(b,i)<k}^{i} y(b,i) + \sum_{L(c,i)<k}^{i} y(c,i)\right)}{N_{bc}} > c\right\}\right) \quad (3)$$

In the expressions (2) and (3), $N_{ab}$ is the total value of the number of images included in the classification a and the number of images included in the classification b, and likewise $N_{bc}$ is the total value of the number of images included in the classification b and the number of images included in the classification c. Further, $y(a, i)$ is the function of returning "1" when the certain image i is included in the classification a and returning "0" when the certain image i is not included in the classification a. Likewise, $y(b, i)$ is the function of returning "1" when the image i is included in the classification b and returning "0" when the image i is not included in the classification b, and $y(c, i)$ is the function of returning "1" when the image i is included in the classification c and returning "0" when the image i is not included in the classification c. Further, $L(a, i)$ is the likelihood ratio of the image i included in the classification a, $L(b, i)$ is the likelihood ratio of the image i included in the classification b, and $L(c, i)$ is the likelihood ratio of the image i included in the classification c.

That is, the sum portion in the expression (2) is equivalent to the total number of the images which are included in the classification a and of which the likelihood ratios are smaller than k, and the two sum portions imply the total number of images which cannot be correctly classified in the respective classifications a and b when the border value to the likelihood ratio is set to k. That is, the value of the fraction is equivalent to the degree of separation to the classifications a and b when the border value to the likelihood is set to k. Finally, the obtained value is compared with the constant c (e.g., 0.9), and k which is the maximum value among the values satisfying the condition is determined as the threshold Th1. The threshold Th2 can be likewise determined by using the expression (2).

Incidentally, the reason why only the erroneous detection frequently occurring is extracted in the step S1102 is that, if the method of the present embodiment is applied to all the erroneous detections, the number of classifications becomes enormous and thus the process becomes seriously complicated. Besides, there is another reason that, since credibleness based on the statistical data cannot be obtained for the low-frequency erroneous detections, accuracy cannot be assured.

In the present embodiment as described above, for the human body candidate areas which are in the specific overlapping relation, it is discriminated by using the likelihood ratios whether or not the respective human body candidate areas are the erroneous detections. Thus, it is possible to reduce the number of erroneous detections without deteriorating the detection rate of the human body area being the desired recognition target.

Second Embodiment

In the step S211 of the first embodiment, the threshold is set to the likelihood ratio of the overlapping area, and the overlapping area is discriminated based on the magnitude relation of the set thresholds. In the second embodiment, as an alternative method, there is provided a method of performing the discrimination by using a discriminator (recognition model) which inputs the overlapping state of the overlapping area and outputs the discrimination result of the overlapping area. Hereinafter, only the portions different from the first embodiment will be described.

Figure 18:
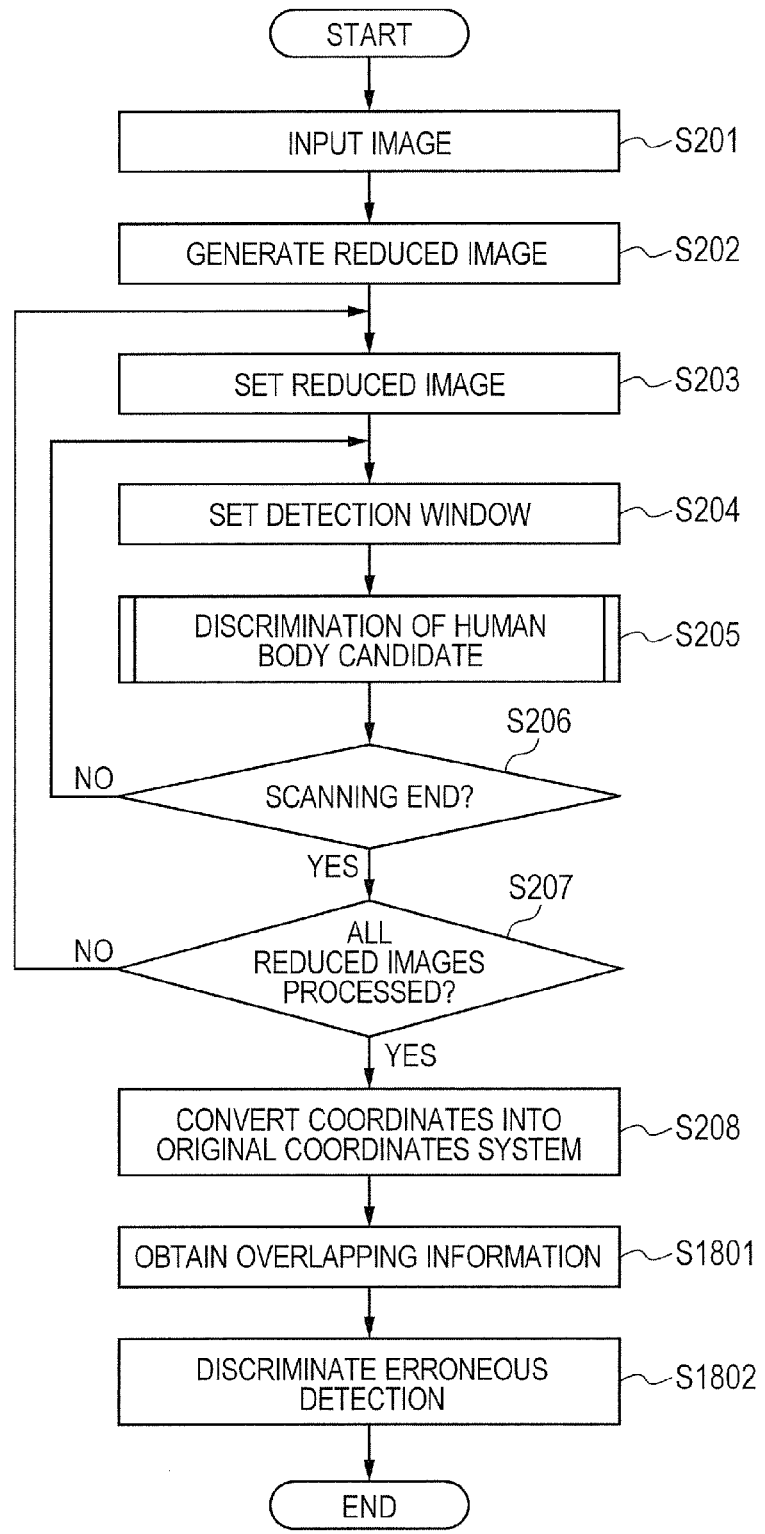
FIG. 18 is a flow chart for describing an example of a processing procedure according to a second embodiment.

Hereinafter, the processing procedure according to the second embodiment will be described with reference to a flow chart illustrated in FIG. 18. In FIG. 18, the step of the process same as that in the first embodiment is indicated by the same step number as that in the first embodiment, and the explanation thereof will be omitted. In any case, it is assumed that the processes in the present embodiment are also performed by the image identifying apparatus illustrated in FIG. 1.

In a step S1801, the overlapping area extracting unit 106 extracts the overlapping area set from among the human body candidate areas 401 to 406 illustrated in FIG. 4, and then calculates from the areas the four parameters (the angle θ between the two areas, the ratio L of the straight line m to the width of the large area, the ratio Rw of the width, and the ratio Rh of the height) defined in the step S210 as the information indicating the overlapping state.

Then, in a step S1802, the overlapping state classifying unit 107 inputs the four parameters (θ, L, Rw, Rh) calculated in the step S1801 and the likelihood of the area set, and discriminates the erroneous detection by using the discriminator of outputting whether or not the erroneous detection is included in the area set. For example, the discriminator which has been formed based on a large number of previously prepared image data by a classifier such as an SVM (support vector machine) or the like may be used.

Incidentally, when a two-class classifier is used as the classifier, the following three two-class classifiers may be created and applied in a sequential order.

the classifier for discriminating whether the classification is the classification a in the step S1104;
the classifier for discriminating whether the classification is the classification b in the step S1104; and
the classifier for discriminating whether the classification is the classification c in the step S1104.

On the other hand, when a multi-class classifier is used as the classifier, the classifier for performing the classification to the three classes corresponding to the classifications a, b and c of the step S1104 may be created.

Figures 19, 20:
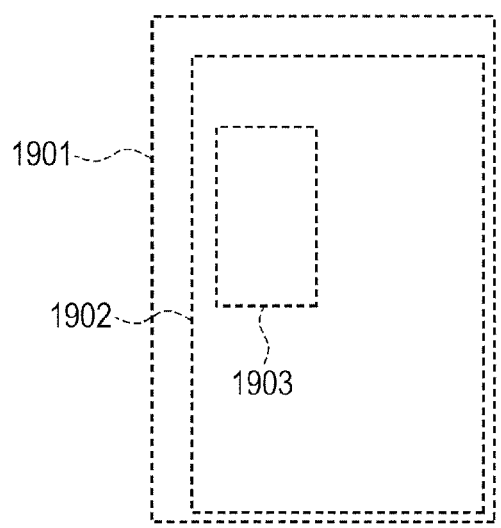
FIG. 19 is a diagram for describing an example that there are three overlapping areas.
FIG. 20 is a diagram indicating a correspondence table of overlapping areas and results of discriminating processes.

In the above description, the overlapping area includes the two areas in the step S209. However, the above method can be likewise used to a case where the overlapping area includes three or more areas. Hereinafter, two methods to be applied to a case where the number of candidate areas is three will be described. In FIG. 19, areas 1901 to 1903 are exemplarily shown as the three candidate areas.

In one of the two methods, the overlapping state classifying unit 107 processes the three pairs in the sequential order, deletes, from the candidate area, the area which has been once discriminated as the erroneous detection, and then processes only the remaining pairs of the candidate areas. Namely, the pair of the two areas is first created. In FIG. 19, three pairs $P_{AB}$, $P_{BC}$ and $P_{AC}$ are created. Here, it should be noted that the pair $P_{AB}$ indicates the pair of the area 1901 and the area 1902, the pair $P_{BC}$ is the pair of the area 1902 and the area 1903, and the pair $P_{AC}$ is the pair of the area 1901 and the area 1903.

Next, the overlapping state classifying unit 107 performs the discriminating process of discriminating whether or not there is the erroneous detection area for the three pairs, by the above method. Then, once the erroneous detection is discriminated, the discriminating process is not performed to the subsequent pair for the relevant area. For example, in a case where the discriminating process of the pair $P_{AB}$, the discriminating process of the pair $P_{BC}$ and the discriminating process of the pair $P_{AC}$ are sequentially performed, when it is discriminated in the discriminating process of the pair $P_{AB}$ that the area 1901 is the erroneous detection, it is discriminated at this point that the area 1901 is the erroneous detection, and this area is deleted from the candidate area. Thus, the discriminating process of the pair $P_{AC}$ to be scheduled as the third process is omitted.

In the other of the two methods, the erroneous detection discriminating process is performed to all the pairs, and the final discrimination is performed by voting the discrimination results. The overlapping state classifying unit 107 first performs the erroneous detection discriminating process to each of the overlapping pairs $P_{AB}$, $P_{BC}$ and $P_{AC}$ by the above method. Next, the overlapping state classifying unit 107 aggregates the results of the erroneous discriminating processes in a voting manner for the areas 1901 to 1903, and determines this voting result as the final discrimination result. For example, in such a case where the aggregation result is shown in FIG. 20, with respect to the area 1901, since two votes are given as the erroneous detections and zero vote is given as the human body, it is discriminated that the erroneous detection occurs. In the same manner, it can be discriminated that the areas 1902 and 1903 are the human body areas respectively.

Incidentally, in the latter method, as the result of the erroneous detection discriminating process, the two values one indicating that each area is the human body area and the other indicating that the erroneous detection occurs are output. However, the result of the erroneous detection discriminating process may be output as the likelihood of the human body area. In this case, the output likelihoods are aggregated, and the threshold is set to the aggregated likelihoods. Thus, it is possible to discriminate whether each area is the human body area or the erroneous detection area.

As just described, since the discriminator for discriminating the erroneous detection based on the likelihood ratio and the overlapping information is used for the human body candidate area being in the overlapping relation, it is possible to identify the erroneous detection in the human body candidate area and delete it from the candidate area. Further, it is possible to likewise discriminate the erroneous detection area even in the case where the three or more areas are in the overlapping relation.

Other Embodiments

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199880, filed Sep. 13, 2011, which is hereby incorporated by reference herein in its entirety.

What is claimed is:

1. An image recognizing apparatus comprising:
    a detecting unit configured to detect, from an input image, a candidate area for a target of recognition, based on a likelihood of a partial area in the input image;
    an extracting unit configured to extract, from a plurality of candidate areas detected by the detecting unit, a set of the candidate areas which are overlapped with each other;
    a determination unit configured to determine an overlapping state of the set of the overlapped candidate areas;
    a selecting unit configured to calculate a ratio of the respective likelihoods of the overlapped candidate areas and select a discrimination rule, according to the determined overlapping state of the set of the overlapped candidate areas, of which a condition is satisfied by the calculated ratio; and
    a discriminating unit configured to discriminate whether or not the respective candidate areas are the target of recognition, by applying the selected discrimination rule in which discrimination results of the respective candidate areas are predetermined.

2. The image recognizing apparatus according to claim 1, wherein the overlapping state of the set of the candidate areas includes a positional relation of the mutual candidate areas in the set extracted by the extracting unit.

3. The image recognizing apparatus according to claim 2, wherein the positional relation includes at least one of directions of the mutual candidate areas, positional displacements of the mutual candidate areas, a ratio of widths of the mutual candidate areas, and a ratio of heights of the mutual candidate areas.

4. The image recognizing apparatus according to claim 1, wherein the extracting unit extracts, as the set of the candidate areas which are overlapped with each other, the set of the candidate areas in which one of the candidate areas includes the other of the candidate areas.

5. An image recognizing method executed by an image recognizing apparatus, the method comprising:
    detecting, from an input image, a candidate area for a target of recognition, based on a likelihood of a partial area in the input image;
    extracting, from a plurality of candidate areas detected in the detecting step, a set of the candidate areas which are overlapped with each other;
    determining an overlapping state of the set of the overlapped candidate areas;
    calculating a ratio of the respective likelihoods of the overlapped candidate areas and selecting a discrimination rule according to the determined overlapping state of the set of the overlapped candidate areas, of which a condition is satisfied by the calculated ratio; and
    discriminating whether or not the respective candidate areas are the target of recognition, by applying the selected discrimination rule in which discrimination results of the respective candidate areas are predetermined.

6. A non-transitory computer-readable storage medium storing computer-executable code of a program for causing a computer to perform the image recognizing method according to claim 5.

* * * * *